Nov. 12, 1946.  S. A. SCHERBATSKOY  2,411,117

SEISMOMETER

Filed June 10, 1943

INVENTOR
Serge A. Scherbatskoy.

Patented Nov. 12, 1946

2,411,117

UNITED STATES PATENT OFFICE 2,411,117

SEISMOMETER

Serge A. Scherbatskoy, Tulsa, Okla., assignor to Seismic Engineering Company, Dallas, Tex.

Application June 10, 1943, Serial No. 490,373

1 Claim. (Cl. 177—352)

This invention relates to a detector of seismic waves or what is commonly known as a seismometer.

With similar objects in view, a number of devices of this nature have been used in the past. These may be roughly classified as:

(a) Mechanical devices such as are usually used for recording natural earthquake waves;

(b) Electrostatic devices in which the space between two condenser plates is varied by the earth movements;

(c) Piezo-electric devices in which crystals having piezo-electric properties are stressed by the earth movements, thus generating electric currents;

(d) Bolometer devices in which bellows actuated by seismic waves force air currents to pass through bolometers, thereby varying the bolometer potentials;

(e) Electromagnetic devices of the moving coil variety, in which the position of a coil or coils relative to a magnetic field of substantially constant strength is varied by the earth movements, causing a cutting of magnetic lines of force by the coil or coils thus generating electric currents or potentials therein; and (f) Electromagnetic devices in which the reluctance of a magnetic circuit is varied by earth movements, and the resultant variable fluxes are interlinked with electric coils in which corresponding electric currents or potentials are generated.

The above devices can, of course, be used to detect and/or record disturbances, vibrations or movements in any type of material with which they are in contact and are not confined to the study of natural or artificial earthquakes.

It is the purpose of my invention to provide a new type of seismometer utilizing an electrolyte and two electrodes immersed in the electrolyte and in which the distance between the electrodes is varied by the earth movements. Such a seismometer will be included in a suitable electrical network energized by a source of electrical energy and across the output terminals of the electrical network, electrical currents will be obtained which will correspond to the seismic waves impinging on the seismometer. These electric currents, with or withut suitable amplification, are transmitted to oscillograph elements, the movements of which are recorded on a moving photographic strip and represent graphically vibrations caused by the impinging seismic waves. Such a seismometer is particularly adapted to the art of seismic surveying in which artificial earthquakes are generated by means of explosives or otherwise and the resulting seismic waves after refraction and/or reflection from sub-surface formations are detected by seismometers.

It is a further purpose of my invention to provide an improved form of construction of vibrational resistances of the type referred to. This construction relates particularly to vibrational electrolytic resistances in which the distance between the electrodes can be varied when the device is exposed to the vibrations that it is desired to measure or to detect.

In general, it is an object of my invention to provide a device for translating mechanical vibrations into electrical currents which involves the principle of varying the distance between electrodes immersed in an electrolyte. Such a device may be constructed in an efficient and compact manner similar to well known other devices for translating mechanical vibrations into electrical currents. Other objects and advantages of the invention will be apparent from the following descriptions when read in conjunction with the drawing, in which:

Fig. 1 shows constructional details of my device in a vertical cross section and includes also an electrical network connected to the device, the said network containing a Wheatstone bridge. One arm of the bridge consists of the electrolytic resistance of my device. The network is energized with A. C. current.

Before proceeding with a detailed description it should be mentioned that any seismograph, whether electrical, mechanical, or otherwise, consists essentially of a frame and of a vibrating mass attached to the frame. The connection between the frame and the vibrating mass is in nearly all cases elastic, that is, it consists of a spring which permits the vibration of the mass. The period of vibration of the mass is adjusted by means of the constants of the spring or by means of additional auxiliary springs. Whenever the ground upon which the seismograph is standing vibrates, as from a natural or artificial earthquake, the frame of the instrument moves with the ground; the mass, which is usually referred to as the "suspended mass," remains substantially at rest. The relative motion or displacement between frame and suspended mass is then utilized for the generation of an electric current in the case of an electric seismograph or in the case of a mechanical seismograph directly actuates a recording stylus after suitable magnification by means of levers.

Figure 1:
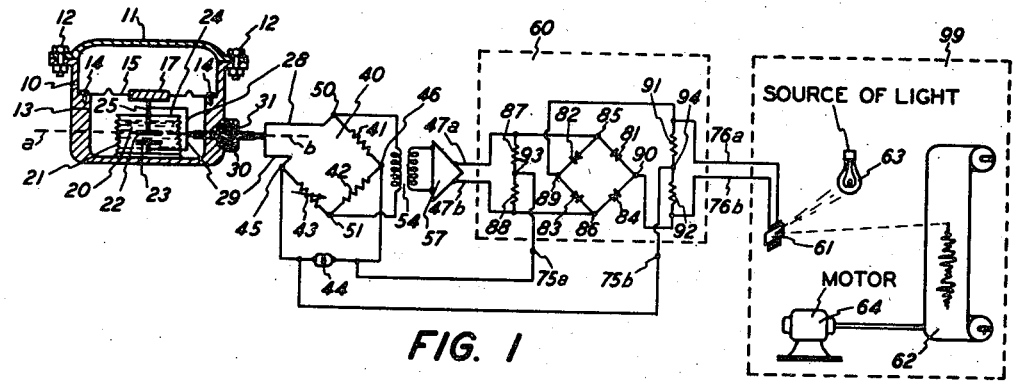
Figure 2:
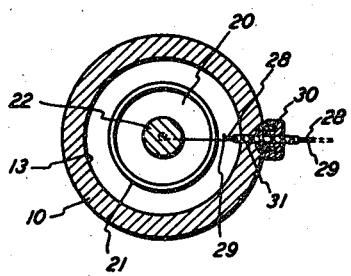
Fig. 2 shows a horizontal cross section of the device illustrated in Fig. 1, the said cross section being taken along a line ab in Fig. 1.

Referring to the drawing and more particularly to Figs. 1 and 2 of the drawing, I have provided a casing 10 adapted to be buried or otherwise anchored to the ground so that it will be responsive to slight movements or vibrations of the ground, such for instance as those which might be produced by the passage through the ground of sound or compressional waves. The casing is provided with a cover member 11 securely attached to the casing 10 by suitable screws 12. A ledge 13 is formed on the inner surface of the casing and to this ledge is rigidly secured by means of suitable screws 14 an annular elastic membrane 15, made preferably of thin flexible steel. The elastic membrane 15 is in the form of a ring having its outer periphery rigidly secured to the ledge 13 and having its inner periphery rigidly connected to an inertia member which consists of a steel cylinder 17 having a relatively large mass. Within the lower part of the casing 10 there is arranged an electrolytic cell 20 which consists of a container 21 filled with a suitable electrolyte and of two electrodes 22 and 23 immersed in the electrolyte at suitable distances one from the other. The container 21 is of a cylindrical bellows-like form. It has its base securely attached to the bottom of the casing 10 and is provided with a cover 24 having the form of a steel disc and rigidly connected to the inertia member 17 by means of a rod 25. The walls of the container 21 are made of thin undulated elastic sheet which gives to the container a bellows-like appearance. The walls are flexible and therefore make it possible for the container to expand or to contract by increasing or decreasing the distance between the top cover 24 and the bottom of the casing. The electrodes 22 and 23 are rigidly connected to the cover 24 and the bottom of the casing respectively, and therefore, when the container 21 is subjected to bellows-like motion by expanding or contracting its volume the distance between the electrodes 22 and 23 alternately increases or decreases.

Electrical connecting leads 28 and 29 are secured to the electrodes 22 and 23 respectively. These connecting leads pass outwardly from the casing through a stuffing box 30 provided with a suitable packing 31.

If the casing 10 is stationary an equilibrium condition is reached between the pull of gravity upon the inertia member 17 and the corresponding reaction of the resilient membrane 15. This condition is characterized by a certain geometrical configuration of the whole assembly in which the electrodes 22 and 23 are spaced one from the other at a certain predetermined distance. It is well known that the electrolytic resistance between the electrodes 22 and 23 depends upon the resistivity of the electrolyte which is a function of factors such as the nature of the electrolyte, its concentration, temperature, etc., and also depends upon the distance between the electrodes. The resistivity of the electrolyte is assumed to be known and constant during the process of observation and consequently under the aforementioned conditions when the casing is stationary the electrolyte resistance between the electrodes 22 and 23 has a fixed and predetermined value, because the distance between the electrodes 22 and 23 is fixed and predetermined.

It is readily appreciated that if the casing 10 is moved up and down, for instance by sound vibrations or otherwise, the inertia member 17 will tend to remain stationary and the distance between the electrodes 22 and 23 will vary because of the flexibility of the walls of the container 21 which will produce bellows-like motions by allowing the volume of the container to alternately expand and contract. It is obvious that the variation in the distance between the electrodes 22 and 23 will cause variations in the electrolytic resistance between these electrodes. Consequently, changes in electrolytic resistance between the connecting leads 28 and 29 will be produced by a passing seismic wave when the casing 10 is buried or otherwise anchored in the ground.

The electrolytic resistance of the geophone is measured by means of a Wheatstone bridge 40. The bridge is shown as formed by four resistances, such as resistors 41, 42, 43 and the varying electrolytic resistance inserted between the leads 28 and 29. A source of alternating current 44 of a frequency $f$ is applied between the terminals 45 and 46, the terminal 45 being the point of junction of the resistor 43 and the lead 29 and the terminal 46 being the point of junction of the resistors 41 and 42. The resistors 41, 42 and 43 have been so chosen that when the casing 10 is stationary the ratio of resistance 41 to resistance 42 is equal to the ratio of the electrolytic resistance to the resistance 43. It can readily be shown that the bridge is "balanced," that is, the potential difference resulting from the source 44 and applied across the terminals 45 and 46 will cause no potential difference to exist between terminals 50 and 51, the terminal 50 being the point of junction of the resistor 41 and of the lead 28, and the terminal 51 being the point of junction of the resistors 42 and 43. The terminals 50 and 51 are connected to the primary windings of the transformer 54, the secondary windings of which are connected to the input terminals of an amplifier 57. Thus under such circumstances no matter what voltage is derived from the source 44 no signal appears across the output terminals of the amplifier 57.

As described in the preceding paragraphs the geophone consists of a casing 10 which is the wave responsive element adapted to be buried or anchored in the ground or other medium in order to partake in the vibration. The inertia element 17 is mounted upon the diaphragm 15 in such a relation to the casing 10 that a relative movement will be produced between the inertia element and the casing whenever a vibration or train of waves strikes the device. An electrolyte is provided within the device and suitable electrodes are arranged within the electrolyte in such a manner that the relative distance between the electrodes 22 and 23 varies in accordance with the relative movement between the casing 10 and the inertia element 17. Consequently, whenever a vibration or a train of waves strikes the geophone the resistance of the electrolyte as viewed from the leads 28 and 29 is varied in accordance with the said vibration or said train of waves.

Now assume that the geophone is properly inserted in the ground and a vibration is received which tends to move the casing upwardly. Due to the inertia of the member 17 the distance between the electrodes 22 and 23 decreases and consequently the electrolytic resistance as viewed from the leads 28 and 29 decreases. It will be readily appreciated that under such conditions the ratios between the resistance 43 and the electrolytic resistance changes and the bridge becomes unbalanced and as the motion of the casing upwards continues, the said ratio departs more and more from the balanced condition. Consequently, an unbalance voltage appears across the output terminals of the transformer 54, the magnitude of this voltage increasing with the motion of the casing 10 in the upward direction. After having attained a certain maximum displacement in the upward direction the geophone casing begins to move downward, passes through the original neutral position and continues its downward motion. Then the corresponding unbalance voltage across the output terminals of the transformer 54 decreases its magnitude, passes through the zero value, subsequently it reverses its polarity and increases again with the downward motion of the casing 10. It is therefore apparent that the unbalance voltage appearing across the output terminals of the transformer 54 is being represented by a modulated carrier, the frequency of the carrier being the same as that of the source 44 and the modulation varying in accordance with the motion of the geophone casing 10. It is desired to reproduce electrically the geophone motion and I am accomplishing this purpose by demodulating the unbalance voltage derived from the Wheatstone bridge. Consequently in such an arrangement the instantaneous value of such a demodulated voltage will represent at any instant the magnitude of the displacement of the casing 10 from its neutral position and the polarity of this voltage will indicate at any instant whether or not the impressed displacement has been effected in the upward or in the downward direction. In order to accomplish this purpose I am amplifying the output voltage derived from the unbalanced bridge in an A. C. amplifier 57 and am subsequently applying the output terminals of the amplifier 57 to a ring modulator contained within the dotted rectangle 60. The ring modulator 60 is provided with two pairs of input terminals 47a, 47b and 75a, 75b respectively and one pair of output terminals 76a, 76b. The input terminals 47a, 47b are connected to the output of the amplifier 57, the input terminals 75a, 75b receive the output from the source of voltage 44 and the output terminals 76a, 76b are connected to a recorder included in the dotted rectangle 99.

The ring modulator is well known in the art and has been described in an article by R. S. Carruthers on "Copper oxide modulators in carrier telephone systems," the Bell System Technical Journal, vol. XVIII, 1939, pp. 315–337. The type of the circuit contained in the dotted rectangle 60 is illustrated in Fig. 2c page 318 of the said article. The ring modulator is essentially a double balanced modulator. By double balanced is meant a modulator in which each input is balanced out from the output, and the output contains therefore substantially only the modulation products.

Across the output terminals 76a, 76b of the modulator 60 therefore appears a signal which among other modulation products contains signals corresponding to the product between the signal supplied from terminals 47a, 47b and the signal supplied from terminals 75a, 75b.

Consider now the ring modulator circuit contained in the rectangle 60. The circuit shown therein comprises a bridge circuit consisting of four rectifiers 81, 82, 83, 84 each of the said rectifiers constituting a separate arm of the bridge circuit and arranged so that the current can flow only in an anticlockwise direction. The upper corner of the bridge 85 and the lower corner of the bridge 86 are respectively connected to the input terminals 47a, 47b and are also connected one to another by means of equal resistances 87 and 88 in series. The other corners of the bridge 89, 90 are respectively connected to the output terminals 76a, 76b and are also connected one to another by a pair of equal resistances 91, 92 in series. The other input terminals 75a, 75b of the ring modulator are respectively connected to the point 93 connecting the resistances 87, 88 and to the point 94 connecting the resistances 91, 92.

With the circuit as described, current derived from the terminals 47a, 47b may flow either through the rectifiers 82, 83 or through the rectifiers 84, 81 depending upon its direction, but it can never flow through all the four rectifiers at the same time, since the rectifiers 82, 83 on one hand and the rectifiers 84, 81 on the other hand are arranged to flow in opposite directions.

Suppose now for purpose of illustration that the voltage derived from the terminals 75a, 75b and the unbalance voltage derived from the terminals 47a, 47b are simultaneously applied, and suppose that both voltages are in phase, i. e., the terminal 47a becomes positive as compared to the terminal 47b and at the same time the terminal 75a becomes positive as compared to the terminal 75b. Then one part of the current tends to flow from the terminal 75a to the terminal 93 and through the resistor 87 to the terminal 85 and then through the rectifier 82 and through the resistor 91 back to the terminal 75b. The other part of the current tends to flow from the terminal 75a to the terminal 93 and through the resistor 88 back to the terminal 86 and through the rectifier 84 and through the resistor 92 back to the terminal 75b. The currents flowing through the resistors 91, 92 are equal and of opposite directions.

It is apparent that under the conditions described in the preceding paragraph the polarity of the terminals 85, 86 will be positive with respect to the polarity of the terminals 90, 89. Consequently, positive voltages are applied to rectifiers 82, 84. Therefore, these rectifiers will lose their ability of rectifying currents, and will allow currents to traverse them in both directions. At the same time negative voltages are applied to rectifiers 81, 83; consequently, the rectifiers 81, 83 will retain their rectifying ability and will block currents attempting to traverse them in the negative direction. Therefore, the rectifiers 82 and 84 are conductive in both directions, and consequently, when the unbalance voltage is being developed across the terminals 47a, 47b, we find that a current tends to pass from the terminal 47a to the terminal 85 and then through the rectifier 82 through the resistors 91 and 92 to the terminal 90 then through the rectifier 84 back to the terminal 47b. This current superposes itself upon the current which is already flowing through the resistors 91 and 92 and consequently the resultant current passing through the resistor 91 becomes larger than the current passing through the resistor 92, consequently, the balancing that existed before is offset because there is a situation where the current flow through the resistor 91 is increased as compared to the current flow through the resistor 92. Thus the voltage drop across the resistor 91 becomes greater and a positive overall voltage is developed across the terminals 76a, 76b. It can be also readily seen that when the unbalance voltage applied across the terminals 47a, 47b increases in magnitude the corresponding resultant voltage obtained across the output terminals 76a, 76b increases in magnitude also.

It can be shown that if the polarity of the first input voltage would reverse with respect to the second input voltage, i. e., if we suppose that the terminal 75a becomes positive as compared to the terminal 75b and the terminal 47a becomes negative as compared to the terminal 47b then the balance becomes offset in the opposite direction, because there is a situation where the current flow through the resistor 92 is increased as compared to the current flow through the resistor 91. Then the voltage drop across the resistor 91 becomes smaller and the overall voltage developed across the output terminals 76 has a polarity opposite to the case described above.

It can also be shown that in an intermediate situation where the signal voltage derived from the input terminals 75a, 75b is displaced by 90 degrees with respect to the voltage derived from the input terminals 47a, 47b then the D. C. voltage output from ring modulator is zero.

Let us designate the voltage applied across the terminals 75a, 75b as $E_1 \sin 2\pi ft$. Then the unbalance voltage derived from the Wheatstone bridge and applied across the terminals 47a, 47b can be represented by a carrier of the frequency $f$, modulated by the geophone motion according to a function $A(t)$ which represents the variation of the instantaneous displacement of the geophone casing with respect to time.

Consequently, the unbalance voltage can be represented by the following expression: $A(t) \sin 2\pi ft$. It can be readily appreciated that under these conditions the voltage derived from the output terminals 76a, 76b of the ring modulator varies with time as the function $A(t)$, i. e., this voltage represents the earth motion. The voltage derived from the ring modulator is subsequently applied to the recorder 99.

The recorder 99 may be of conventional type used in seismic prospecting, which includes a moving coil galvanometer connected to the terminals 76a, 76b having a mirror 61 attached to its coil. This galvanometer is arranged in such relation to a moving strip of sensitized paper 62 and to a light source 63 so as to record on the paper a wave form or "trace" which has its longitudinal axis parallel with the longitudinal axis of the strip of paper. This strip of paper is moved longitudinally at a substantially constant speed by means of a motor 64.

Figure 3:
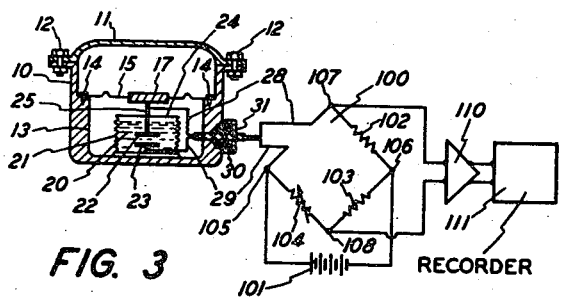
Fig. 3 shows the device illustrated in Fig. 1 and includes also an electrical network connected to the device and energized by a D. C. current.

Fig. 3 illustrates another embodiment of my invention in which in place of an A. C. source of electrical energy a D. C. source is used. The geophones used in the arrangements of Fig. 1 and of Fig. 3 are of an identical construction. In Fig. 3 however, the output leads 28 and 29 of the geophone are connected to a Wheatstone bridge circuit 100 which is energized by a D. C. source of voltage, which is represented by a battery 101. One arm of the Wheatstone bridge consists of the electrolytic resistance inserted between the leads 28, 29 and the remaining three arms of the bridge circuit consists of resistors 102, 103 and 104. The resistor 104 is in series with the electrolyte of the geophone, the resistor 102 is in series with the resistor 103, and the resistors 102, 103 are in parallel with the resistor 104 and the electrolyte. The battery 101 is connected across the diagonal points 105 and 106 of the bridge. The other diagonal points 107, 108 are connected to the input terminals of an amplifier 110 the output terminals of which are connected to the recorder 111. The recorder 111 is of a construction similar to the recorder 99 in Fig. 1.

When the casing of the geophone is stationary, i. e., in the absence of any seismic excitation, the resistance of the electrolyte between the leads 28, 29 depends upon the surrounding temperature. In order to compensate any possible variations in the ambient temperature the resistor 104 of the bridge is made adjustable and its value is so adjusted that it is exactly the same as the resistance of the electrolyte in the geophone. The resistances of the arms 102 and 103 are made equal one to another. Under such conditions the bridge is balanced and no voltage appears across the input terminals of the amplifier 110. Consequently, the signal applied to the recorder 111 is zero.

When, however, the geophone casing 10 is moved upward by an incoming seismic wave, the resistance of the electrolyte between the leads 28, 29 decreases. Consequently the bridge 100 becomes unbalanced and a D. C. voltage appears across the output terminals of the amplifier 110. It can be readily appreciated that the magnitude of the said voltage represents the degree of unbalance of the bridge. Consequently, when the motion of the casing 10 upwards continues, the unbalance of the bridge continues and the voltage across the output terminals of the amplifier 110 becomes larger. When, however, the motion of the casing upwards has attained a maximum and then decreases by passing through the normal equilibrium position the voltage across the terminals of the amplifier 110 decreases and reaches the value zero.

The seismic disturbances striking the geophone are of an oscillatory character and therefore they cause the casing of the geophone to move upwards to a maximum upward displacement then downwards through the neutral position to a maximum downward displacement then back to the neutral position, etc. It is readily apparent that when the casing passes through its neutral position in the downward direction, the unbalance voltage across the output terminals of the amplifier 110 reappears again with a polarity which is opposite to the one referred to in the preceding paragraph. Consequently, the polarity of the unbalance voltage appearing across the output terminals of the amplifier 110 represents the upwards or downward direction of the impressed displacement, and the magnitude of the voltage represents the magnitude of the displacement. The unbalance voltage derived from the amplifier 110 is recorded in the recorder 111 and provides a representation of the corresponding seismic disturbances.

We shall consider now the most suitable electrolytes that may be used in order to provide a variable A. C. resistance in the embodiment of Fig. 1 or a variable D. C. resistance in the embodiment of Fig. 3.

Electrolytic resistors of many types and kinds have been made in the past, but most of them were subject to limitations of polarization, gassing, non-uniformity or lack of permanence. The use of electrolytic resistors has been confined therefore to applications in which these detrimental features were not objectionable or for which they possessed some positive advantages. Because of polarization and gassing when used with direct currents, electrolytic resistors are more generally associated with A. C. circuits. However, certain types may be used successfully in D. C. circuits.

The electrolyte used in the devices shown in Fig. 1 or Fig. 3 may consist of copper sulphate and the electrodes of copper plates or of mercury nitrate with mercury electrodes, or any other combination of electrolyte and electrodes such that the passage of current through the electrolyte does not cause any change in the chemical constitution of the electrolyte or of the electrodes and no gases are generated. Such an electrolyte may be used in connection with A. C. or D. C. currents.

Instead of employing electrodes and an electrolyte which undergo no change in their chemical constitution by the passage of the current, electrodes and an electrolyte in which such change does occur may be employed, but in this case it is desirable to select the electrolyte and the electrodes so that the chemical changes are reversible, whereby permanent change in the chemical constitution can be prevented by reversing the direction of current flow from time to time. Such an arrangement is illustrated in Fig. 1 an A. C. source is being supplied to the terminals 45 and 46 of the Wheatstone bridge and causes periodic reversals of the current passing through the electrolyte between the electrodes 22 and 23.

Figure 4:
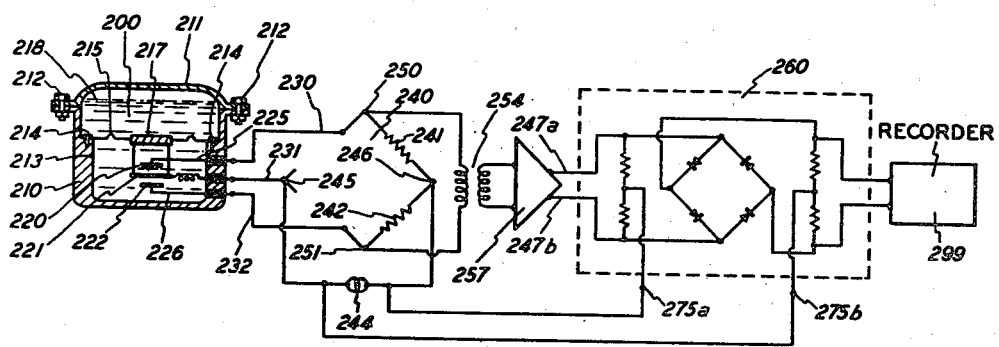
Fig. 4 shows schematically my device in a modified form and includes also an electrical network connected to the device, the said network being energized by an A. C. current and containing a Wheatstone bridge two arms of which consist of the electrolytic resistance of my modified device.

Consider now Figure 4 representing an improved system for deriving a voltage from a varying electrolytic resistance. The geophone shown in the figure and designated by the numeral 200 consists of a casing 210 adapted to be buried in the ground so that it will be responsive to the vibration of the ground. The casing is provided with a cover member 211 securely attached to the casing 210 by suitable screws 212. A ledge 213 is formed on the inner surface of the casing and to this ledge is secured by means of suitable screws 214 an annular membrane 215 made preferably of thin flexible steel. The membrane 215 is in the form of a ring having its outer periphery rigidly secured to the ledge 213 and having its inner periphery rigidly connected to an inertia member which consists of a steel cylinder 217 having a relatively large mass. Casing 210 contains an electrolyte which fills it almost completely, the upper level of the said electrolyte being designated by 218. Within the electrolyte 3 electrodes are immersed: an upper electrode 220, intermediate electrode 221 and a lower electrode 222. The electrodes 220 and 222 are rigidly secured to the casing 210 by means of bars 225, 226 respectively and the electrode 221 is rigidly secured to the inertia member 217 and participates in the motions thereof. Electrical connecting leads 230, 231 and 232 are respectively connected to the electrodes 220, 221 and 222.

When the casing 210 is stationary an equilibrium condition is reached between the pull of gravity upon the inertia member 217 and the corresponding reaction of the resilient membrane 215. This condition is characterized by a certain geometrical configuration of the whole assembly in which the electrodes 220 and 222 are spaced from the intermediate electrode 221 by predetermined amounts. If, however, the casing 10 is moved upwards or downwards by incoming seismic vibrations, then the inertia member 217 will tend to remain stationary and the distances between the electrodes 222 and 220 from the intermediate electrode 221 will correspondingly vary. It is obvious that the variation in the distance between these electrodes will cause variations in the electric resistance between the electrodes. Consequently, a passing seismic wave will cause a motion of the geophone which will in turn produce variations in the electrolytic resistance between leads 230, 231 and the leads 231 and 232 respectively. These electrolytic resistances are inserted into a Wheatstone bridge 240. The bridge is formed of a series of four resistances such as the resistors 241, 242, the varying electrolytic resistances inserted between the leads 230, 231, and the varying electrolytic resistances inserted between the leads 231, 232. A source of alternating current 244 of a frequency $f$ is applied across the terminals 245 and 246, the terminal 245 being connected to the lead 231 and the terminal 246 being a point of junction of the resistors 241 and 242. The resistors 241 and 242 have been shown to be equal one to the other so that when the casing 210 is stationary the bridge is balanced, i. e., the potential difference resulting from the source 244 and applied across the terminal 245, 246 will cause no potential difference between the terminals 250, 251, the terminal 250 being the point of junction of the lead 230 and the resistor 241 and the terminal 251 being the point of junction of the lead 232 and the resistor 242. The terminals 250, 251 are connected to the primary windings of the transformer 254 the secondary windings of which are connected to the input terminal of the amplifier 257. Assume that the geophone is properly inserted in the ground and vibration is received which tends to move the casing 210 upwards. Due to the inertia of the member 217 the distance between the electrodes 222 and 221 decreases and the distance between the electrodes 221 and 220 increases. Consequently, the ratio of the electrolytic resistances between the electrodes 222, 221 and 221, 220 increases and the bridge 240 becomes unbalanced. It is apparent that the more the casing 210 becomes displaced in the upward direction the more unbalanced becomes the bridge and the larger is the unbalanced voltage derived from terminals 250 and 251. This unbalanced voltage is being represented by a modulated carrier the frequency of the carrier being the same as that of the source 244 and the modulation varying in accordance with the motion of the geophone casing 210. It is desired to produce an electrical current that is a facsimile of the geophone motion and I accomplish this purpose by demodulating the unbalance voltage derived from the Wheatstone bridge by means of a ring modulator 260 having its input terminals 247a and 247b connected to the output of the amplifier 257 and having its input terminals 275a, 275b connected to the source of voltage 244. The ring modulator 260 is of a construction substantially similar to the one described by the numeral 60 in Fig. 1. Consequently, the voltage derived from the output terminals of the ring modulator 260 varies with time as the displacement of the geophone casing. This voltage is subsequently applied to a recorder 299 which is of the conventional type substantially similar to the recorder designated by the numeral 99 in Fig. 1. Thus I obtain by means of the recorder 299 a wave form or trace representing the vibration to which the geophone is subjected.

I claim:

A geophone for translating the earth vibrations into corresponding electrical oscillations, said geophone comprising an outer casing adapted to be subjected to the earth vibrations, an inertia member within said casing, a ring-like elastic membrane having its outer periphery secured to the inner walls of said casing and having its inner periphery secured to said inertia member, a flexible bellows-like container located within said casing and below said membrane, a conductive liquid within said container, electrodes immersed in said liquid and suitably positioned within said container in a definite spacial relationship one to another, connecting elements between said electrodes and said outer casing and said inertia member, respectively, whereby variation in the spacing between said electrodes is produced in response to said vibration and the resistance of said liquid between said electrodes varies in accordance with the variation in said spacing.

SERGE A. SCHERBATSKOY.